US010685015B2

(12) United States Patent
Yerkes et al.

(10) Patent No.: US 10,685,015 B2
(45) Date of Patent: *Jun. 16, 2020

(54) METHOD AND SYSTEM FOR PROVIDING IN-LINE SCHEDULING IN AN ON-DEMAND SERVICE

(71) Applicant: salesforce.com, inc., San Francisco, CA (US)

(72) Inventors: Rowland W. Yerkes, San Ramon, CA (US); Ian Price Swinson, Oakland, CA (US)

(73) Assignee: salesforce.com, inc., San Francisco, CA (US)

( * ) Notice: Subject to any disclaimer, the term of this patent is extended or adjusted under 35 U.S.C. 154(b) by 368 days.

This patent is subject to a terminal disclaimer.

(21) Appl. No.: 15/645,932

(22) Filed: Jul. 10, 2017

(65) Prior Publication Data
US 2017/0371919 A1 Dec. 28, 2017

Related U.S. Application Data

(63) Continuation of application No. 14/218,719, filed on Mar. 18, 2014, now Pat. No. 9,703,826, which is a
(Continued)

(51) Int. Cl.
*G06F 16/27* (2019.01)
*G06F 16/24* (2019.01)
*G06Q 10/06* (2012.01)

(52) U.S. Cl.
CPC ............ *G06F 16/24* (2019.01); *G06F 16/275* (2019.01); *G06Q 10/06* (2013.01); *Y10S 715/963* (2013.01)

(58) Field of Classification Search
CPC .. G06F 3/0481; G06F 3/0482; G06F 3/04847; G06F 17/30386; G06Q 10/10
See application file for complete search history.

(56) References Cited

U.S. PATENT DOCUMENTS 5,577,188 A 11/1996 Zhu
5,608,872 A 3/1997 Schwartz et al.
(Continued)

OTHER PUBLICATIONS

Slovak, K, "Absolute Beginner's Guide to Microsoft Office Outlook 2003," Publisher: Que, Pub Date: Oct. 1, 2003.
(Continued)

*Primary Examiner* — Rinna Yi
(74) *Attorney, Agent, or Firm* — Morris & Kamlay LLP

(57) ABSTRACT

A mechanism for providing in-line scheduling in an on-demand service in a database system is proved. The mechanism provides a multi-tenant database that stores client scheduling information, client customer contact information, and enables drag and drop event scheduling. In a multi-tenant database, a system for managing client customer contact information and event scheduling is established, which is useful for a tenant that is a salesperson or that employs salespersons. The multi-tenant database includes a combined view application that provides for the simultaneous display of a calendar view and list view of contact information. The multi-tenant database includes drag and drop functionality, allowing list view information to be dragged and dropped onto the calendar view for event scheduling. The ability of embodiments to provide drag and drop inline event scheduling can enable efficient calendaring of events by rapidly transferring relevant information onto a calendar.

18 Claims, 13 Drawing Sheets

Related U.S. Application Data continuation of application No. 12/584,924, filed on Sep. 14, 2009, now Pat. No. 8,726,179.

(60) Provisional application No. 61/191,912, filed on Sep. 12, 2008.

(56) References Cited

U.S. PATENT DOCUMENTS

| | | |
|---|---|---|
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,069,497 B1 | 6/2006 | Desai |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,603,483 B2 | 10/2009 | Psounis et al. |
| 7,620,655 B2 | 11/2009 | Larsson et al. |
| 7,698,160 B2 | 4/2010 | Beaven et al. |
| 7,779,475 B2 | 8/2010 | Jakobson et al. |
| 7,851,004 B2 | 12/2010 | Hirao et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 8,726,179 B2 | 5/2014 | Yerkes et al. |
| 8,756,275 B2 | 6/2014 | Jakobson |
| 8,769,004 B2 | 7/2014 | Jakobson |
| 8,769,017 B2 | 7/2014 | Jakobson |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0023531 A1* | 1/2003 | Fergusson .............. G06Q 10/10 705/36 R |
| 2003/0066031 A1 | 4/2003 | Laane |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0044646 A1 | 3/2004 | Hullot et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2005/0267975 A1 | 12/2005 | Qureshi et al. |

(56) References Cited

U.S. PATENT DOCUMENTS

| | | | |
|---|---|---|---|
| 2006/0021019 A1 | 1/2006 | Hinton et al. |
| 2007/0203820 A1 | 8/2007 | Rashid |
| 2007/0250784 A1 | 10/2007 | Riley et al. |
| 2007/0271517 A1 | 11/2007 | Finkelman |
| 2008/0082504 A1 | 4/2008 | Jasik et al. |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0158186 A1 | 6/2009 | Bonev et al. |
| 2009/0177744 A1 | 7/2009 | Marlow et al. |
| 2011/0218958 A1 | 9/2011 | Warshavsky et al. |
| 2011/0247051 A1 | 10/2011 | Bulumulla et al. |
| 2012/0042218 A1 | 2/2012 | Cinarkaya et al. |
| 2012/0233137 A1 | 9/2012 | Jakobson et al. |
| 2012/0290407 A1 | 11/2012 | Hubbard et al. |
| 2013/0212497 A1 | 8/2013 | Zelenko et al. |
| 2013/0247216 A1 | 9/2013 | Cinarkaya et al. |

OTHER PUBLICATIONS

ECCO Pro Complete PC Connectivity Solutions—Getting Started Guide, NetManage Inc., Version 4.01.1, Copyright Jul. 1997.
ECCO Pro Complete PC Connectivity Solutions—User's Guide, NetManage Inc., Version 4.01.1, Copyright Jul. 1997.
U.S. Appl. No. 12/584,924—Office Action dated Oct. 31, 2011, 17 pgs (non HBW).
U.S. Appl. No. 12/584,924—Resposne to Office Action dated Oct. 31, 2011, filed Apr. 30, 2012, 33 pgs (non HBW).
U.S. Appl. No. 12/584,924—Office Action dated Aug. 16, 2012, 25 pgs (non HBW).
U.S. Appl. No. 12/584,924—Response to Office Action dated Aug. 16, 2012, filed Feb. 14, 2013, 36 pgs (non HBW).
U.S. Appl. No. 12/584,924—Office Action dated Jun. 20, 2013, 28 pgs (non HBW).
U.S. Appl. No. 12/584,924—Response to Office Action dated Jun. 20, 2013, filed Dec. 5, 2013, 41 pgs (non HBW).
U.S. Appl. No. 12/584,924—Notice of Allowance dated Dec. 26, 2013, 30 pgs (non HBW).
U.S. Appl. No. 14/218,719—Office Action dated Jan. 5, 2016, 34 pgs.
U.S. Appl. No. 14/218,719—Final Office Action dated May 9, 2016, 24 pages.
U.S. Appl. No. 14/218,719—Response to Office Action dated Jan. 5, 2016 filed Apr. 4, 2016, 19 pgs.
U.S. Appl. No. 14/218,719—Response to Final Office Action dated May 9, 2016 filed Aug. 9, 2016, 17 pages.
U.S. Appl. No. 14/218,719—Notice of Allowance dated Mar. 15, 2017, 19 pages.
Non Final Rejection Office Action, U.S. Appl. No. 12/584,924 (non HBW), dated Aug. 16, 2012, 25 pages.
Non Final Rejection Office Action, U.S. Appl. No. 12/584,924 (non HBW), dated Oct. 31, 2011, 17 pages.
Final Rejection Office Action, U.S. Appl. No. 12/584,924 (non HBW), dated Jun. 20, 2013, 28 pages.

* cited by examiner

FIG. 6

| ☆ All Open Leads | 602 | | | | | A\|B\|C\|D\|E\|F\|G\|H\|I\|J\|K\|L\|M\|N\|O\|P\|Q\|R\|S\|T\|U\|V\|W\|X\|Y\|Z\|Other\|All | Help for this Page |
|---|---|---|---|---|---|---|---|
| View: | All Open Leads ▼ | Edit | 606 608 Change Status \| Change Owner \| Add to Campaign \| Close Calendar | 1036 640 | 824 | | |
| 628 632 | Name▲ | Company | City | State/Province | Phone | 610 Email | Lead Status | Created Date |
| ☐ Action | | | | | | | | |
| ☐ Edit \| Del | Antoun, Michelle | All Pro Painting | Belmont | CA | (650) 631-8785 | | Open | 2/27/2008 |
| ☐ Edit \| Del | Appiegate, John | Hallmark Roofing | Belmont | CA | (650) 591-1300 | | Open | 2/27/2008 |
| ☐ Edit \| Del | Asaro, Vince | Asaro Fabrication and Welding | Belmont | CA | (650) 802-9552 | | Open | 2/27/2008 |
| ☐ Edit \| Del | Bala, Dave | Gutter Doctors | Belmont | CA | (650) 592-2419 | | Open | 2/27/2008 |
| ☐ Edit \| Del | Beloe, Joe | Vowels Construction | Fresno | CA | (831) 662-1860 | biah2@biah.com | Open | 2/27/2008 |

Calendar for Joseph Bannon (Change) ◄▲ 04/28/2008 - 05/02/2008 ▦ This Week ☐ Show Weekends ▨ Busy ▧ Out of Office

| | 28 Monday 810 | 29 Tuesday 812 | 30 Wednesday 814 | 1 Thursday 816 | 2 Friday 822 820 |
|---|---|---|---|---|---|
| All Day 802 | 808 | | | | |
| 8:00 AM 804 | | | | | |
| 9:00 AM 806 | | ○ Call: Kevin Webb | | ○ Call: Kevin Webb 818 | |
| 10:00 AM | | | ○ Meeting (Tahoe Conf Room), Sarah Loehr Arborium Oil & Gas | | |
| 11:00 AM | ○ Meeting (Hawaii Conf Room) Harvard Smith | ○ Meeting (Hawaii Conf Room) Harvard Smith | ○ Meeting (Hawaii Conf Room) Harvard Smith | | ○ Meeting (Hawaii Conf Room) Harvard Smith 826 |
| 12:00 AM | | | | | |
| 1:00 PM | | | | | Call: Martin Iskander |

| ☆ All Open Leads | 602 606 608 | | | | | Help for this Page |
|---|---|---|---|---|---|---|
| View: All Open Leads ▼ | Edit | Change Status | Change Owner | Add to Campaign | Close Calendar | A|B|C|D|E|F|G|H|I|J|K|L|M|N|O|P|Q|R|S|T|U|V|W|X|Y|Z|Other|All |
| | 902 | | | | 826 640 1036 | |
| ☐ Action | Name▲ | Company | City | State/Province | Phone 610 Email | Lead Status Created Date |
| ☐ Edit \| Del | Antoun, Michelle ☆ | All Pro Painting | Belmont | CA | (650) 631-8785 | Open 2/27/2008 |
| ☐ Edit \| Del | Antoun, Michelle: All Pro...fing | | Belmont | CA | (650) 591-1300 | Open 2/27/2008 |
| ☐ Edit \| Del | Asaro, Vince | Asaro Fabrication and Welding | Belmont | CA | (650) 802-9552 | Open 2/27/2008 |
| ☐ Edit \| Del | Bala, Dave | Gutter Doctors | Belmont | CA | (650) 592-2419 | Open 2/27/2008 |
| ☐ Edit \| Del | Beloe, Joe | Vowels Construction | Fresno | CA | (831) 662-1860  biah2@biah.com | Open 2/27/2008 |

312

Calendar for Joseph Bannon (Change) ◀ ▶ 04/28/2008 - 05/02/2008  🗓 This Week  ☐ Show Weekends  ▨ Busy  ▧ Out of Office

| | 28 Monday | 29 Tuesday | 30 Wednesday 814 | 1 Thursday | 2 Friday 822 |
|---|---|---|---|---|---|
| All Day | 804 808 | 812 | 816 | 818 | 820 |
| 8:00 AM | 806 | | | | |
| 9:00 AM | | ○ Call: Kevin Webb | ○ Meeting (Tahoe Conf Room), Sarah Loehr Arborium Oil & Gas | ○ Call: Kevin Webb | |
| 10:00 AM | | | | | |
| 11:00 AM | ○ Meeting (Hawaii Conf Room) Harvard Smith | ○ Meeting (Hawaii Conf Room) Harvard Smith | ○ Meeting (Hawaii Conf Room) Harvard Smith | ○ Meeting (Hawaii Conf Room) Harvard Smith | ○ Meeting (Hawaii Conf Room) Harvard Smith 826 |
| 12:00 AM | | | | | |
| 1:00 PM | | | | | Call: Martin Iskander |

802  302

☆ All Open Leads — 602  Help for this Page

View: [All Open Leads ▼]  A|B|C|D|E|F|G|H|I|J|K|L|M|N|O|P|Q|R|S|T|U|V|W|X|Y|Z|Other|All ☐ Action  [Edit] [Change Status] [Change Owner] [Add to Campaign] [Close Calendar] — 610
606  608  826  640 — 1036

| | Name▲ | Company | City | State/Province | Phone | Email | Lead Status | Created Date |
|---|---|---|---|---|---|---|---|---|
| ☐ Edit \| Del | Antoun, Michelle | All Pro Painting | Belmont | CA | (650) 631-8785 | | Open | 2/27/2008 |
| ☐ Edit \| Del | Applegate, John | Hallmark Roofing | Belmont | CA | (650) 591-1300 | | Open | 2/27/2008 |
| ☐ Edit \| Del | Asaro, Vince | Asaro Fabrication and Welding | Belmont | CA | (650) 802-9552 | | Open | 2/27/2008 |
| ☐ Edit \| Del | Bala, Dave | Gutter Doctors | Belmont | CA | (650) 592-2419 | | Open | 2/27/2008 |
| ☐ Edit \| Del | Beloe, Joe | Vowels Construction | Fresno | CA | (831) 662-1860 | biah2@biah.com | Open | 2/27/2008 |

Calendar for Joseph Bannon (Change) ◀ ▶   ☐ Show Weekends  ☒ Busy  ▨ Out of Office
808

| | 28 Monday | 29 Tue | 1 Thursday | 2 Friday — 822 |
|---|---|---|---|---|
| All Day — 802 | 804 | | 820 | |
| 8:00 AM | | | | |
| 9:00 AM — 806 | | | | |
| 10:00 AM | | | ○ Call: Kevin Webb — 1014 | |
| 11:00 AM | ○ Meeting (Hawaii Conf Room) Harvard Smith — 1022 / 1024 | | ▨ Meeting (Hawaii Conf Room) Harvard Smith — 1016 / 1018 | ○ Meeting (Hawaii Conf Room) Harvard Smith |
| 12:00 PM — 1002 | | | 1030 | |
| 1:00 PM | | | | ○ Call: Martin Iskander — 826 |

Event Detail  ✕
Start  [5/1/08]  [10:00 AM]
End    [5/1/08]  [11:00 AM]
Subject: [_____]
[Lead ▼]  [Michelle Antoun]  ☒
[Opportunity ▼] [_____] ☒
Assigned to [William Tardis] ☒
Location    [_____] ☒
Show As [Busy ▼]   ☐ All Day
[Save] [Cancel]
Edit Event Details — 1028
1026

METHOD AND SYSTEM FOR PROVIDING IN-LINE SCHEDULING IN AN ON-DEMAND SERVICE

CLAIM OF PRIORITY

This application is a continuation of U.S. patent application Ser. No. 14/218,719 entitled METHOD AND SYSTEM FOR PROVIDING IN-LINE SCHEDULING IN AN ON-DEMAND SERVICE filed Mar. 18, 2014, now U.S. Pat. No. 9,703,826, which is a continuation of U.S. patent application Ser. No. 12/584,924 entitled METHOD AND SYSTEM FOR PROVIDING IN-LINE SCHEDULING IN AN ON-DEMAND SERVICE filed Sep. 14, 2009, now U.S. Pat. No. 8,726,179, issued May 13, 2014, which claims priority benefit of U.S. Provisional Patent Application 61/191,912 entitled IMPROVED METHOD AND SYSTEM FOR PROVIDING IN-LINE SCHEDULING IN AN ON-DEMAND SERVICE, by Yerkes et al., filed Sep. 12, 2008, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates generally to a method and system for providing in-line scheduling in an on-demand service in a database network system, and more particularly to a method and system for providing in-line scheduling in an on-demand service in a multi-tenant database network system.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

In conventional sales application database systems, users access their data resources in one logical database. A user of such a conventional system typically retrieves data from and stores data on the system using the user's own systems. A user system might remotely access one of a plurality of server systems that might in turn access the database system. Data retrieval from the system might include the issuance of a query from the user system to the database system. The database system might process the request for information received in the query and send to the user system information relevant to the request. The rapid, efficient use of accurate information and subsequent delivery of this information to the user system has been and continues to be a goal of administrators of database systems.

Unfortunately, conventional databases do not include convenient calendaring applications. Although calendar applications may exist in contexts other than in databases, scheduling events, a series of events, or determining calendaring availability require navigating multiple screens, performing multiple selections, performing multiple view changes and is therefore cumbersome and inefficient for the user.

Accordingly, it is desirable to provide techniques for enabling the scheduling of events in an on-demand service in a database system in a manner that improves user efficiency.

BRIEF SUMMARY

In accordance with embodiments, there are provided mechanisms and methods for providing in-line scheduling in an on-demand service in a database system. These mechanisms and methods for providing in-line scheduling can enable embodiments to provide efficient event calendaring without needing to perform multiple view changes and navigating multiple screens. The ability of embodiments to provide a list view of contacts while simultaneously displaying a calendar can enable users to efficiently accomplish the rapid calendaring of events by rapidly transferring relevant information into a calendar. In this specification, the term list view refers to a view in which the information is presented and organized into a series of lists or columns, and a calendar view is a view in which the information is presented in the format of a calendar. For example, a calendar view may show a group of adjacent boxes that correspond to days of the week or days of the month. Additionally, a calendar view may further subdivide the adjacent boxes to correspond to the hours in a day. Although list views are discussed in examples throughout the specification, the invention is not limited to list views. Other views may be substituted wherever list views are referred to in scheduling an event in-line (e.g., by dragging and dropping the information onto the date and/or time of the event within the calendar view). The term in-line refers to the simultaneous display of two different views. For example, a list view may be displayed on the upper portion of a user screen at the same time a calendar view is displayed on the lower portion of the same user screen. Alternatively, a list view and a calendar view may be displayed side by side.

In an embodiment and by way of example, a method for providing in-line scheduling in an on-demand service is provided. The method embodiment includes displaying a list view of contact information to a user and providing a link to a calendar view. The selection of the calendar view link results in the simultaneous display of the calendar view and list view of contact information to the user, which allows the user to drag and drop list view information onto the calendar view.

The term view has particular significance in database theory. Specifically, in database theory a view is a stored query accessible as a virtual table composed of the result set of a query, or more broadly a view in database theory is a virtual table, which may be dynamic, that is computed or collated from data in the database, which in this specification will be referred to as a database view. However, in general the term view as used in this specification is generic to a database view and to an image, depiction, or representation.

While the present invention is described with reference to an embodiment in which techniques for on-demand communities are implemented in a system having an application server providing a front end for an on-demand database service capable of supporting multiple tenants, the present invention is not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples of the invention, the invention is not limited to the examples depicted in the figures.

FIG. 6 is a screenshot of an embodiment of a list view.

FIG. 8 is a screenshot of an embodiment of a list view of contacts displayed along with a calendar view.

FIG. 9 is screenshot of an embodiment of a list view and calendar view with a contact selected from the list view.

FIG. 10*a* is a screenshot of an embodiment of an expanded dialogue box for scheduling an event.

FIG. 10*b* is a screenshot of an embodiment of an event detail dialogue box for an existing scheduled event.

DETAILED DESCRIPTION

General Overview

Systems and methods are provided for providing in-line scheduling in an on-demand service.

As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system.

The following begins with a system overview describing the components of a system for providing in-line scheduling in an on-demand service. Then, mechanisms and methods for providing in-line scheduling in an on-demand service will be described with reference to example embodiments.

System Overview

Figure 1:
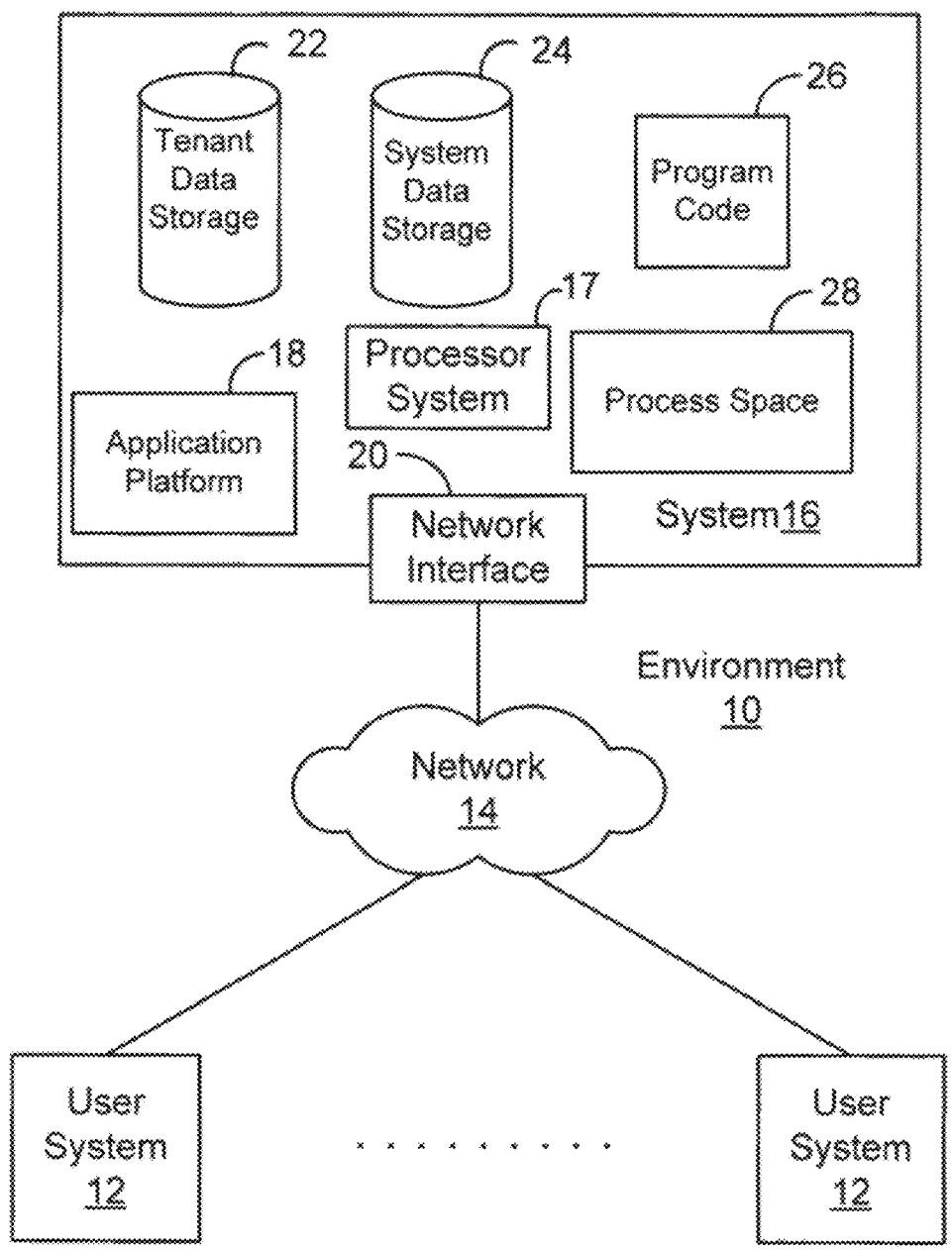
FIG. 1 illustrates a block diagram of an environment wherein an on-demand database service might be used.

FIG. 1 illustrates a block diagram of an environment 10 wherein an on-demand database service might be used. Environment 10 may include user systems 12, network 14, system 16, processor system 17, application platform 18, network interface 20, tenant data storage 22, system data storage 24, program code 26, and process space 28. In other embodiments, environment 10 may not have all of the components listed and/or may have other elements instead of, or in addition to, those listed above.

Environment 10 is an environment in which an on-demand database service exists. User system 12 may be any machine or system that is used by a user to access a database user system. For example, any of user systems 12 can be a handheld computing device, a mobile phone, a laptop computer, a work station, and/or a network of computing devices. As illustrated in FIG. 1 (and in more detail in FIG. 2) user systems 12 might interact via a network 14 with an on-demand database service, which is system 16.

An on-demand database service, such as system 16, is a pre-established database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 16" and "system 16" will be used interchangeably herein. A database image may include one or more database objects. A relational database management system (RDMS) or the equivalent may execute storage and retrieval of information against the database object(s). Application platform 18 may be a framework that allows the applications of system 16 to run, such as the hardware and/or software, e.g., the operating system. In an embodiment, on-demand database service 16 may include an application platform 18 that enables creation, managing and executing one or more applications developed by the provider of the on-demand database service, users accessing the on-demand database service via user systems 12, or third party application developers accessing the on-demand database service via user systems 12.

The users of user systems 12 may differ in their respective capacities, and the capacity of a particular user system 12 might be entirely determined by permissions (permission levels) for the current user. For example, where a salesperson is using a particular user system 12 to interact with system 16, that user system has the capacities allotted to that salesperson. However, while an administrator is using that user system to interact with system 16, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 14 is any network or combination of networks of devices that communicate with one another. For example, network 14 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the present invention might use are not so limited, although TCP/IP is a frequently implemented protocol.

User systems 12 might communicate with system 16 using TCP/IP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP messages to and from an HTTP server at system 16. Such an HTTP server might be implemented as the sole network interface between system 16 and network 14, but other techniques might be used as well or instead. In some implementations, the interface between system 16 and network 14 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 16, shown in FIG. 1, implements a web-based customer relationship management (CRM) system. For example, in one embodiment, system 16 includes application servers configured to implement and execute CRM software applications as well as provide related data, code, forms, webpages and other information to and from user systems 12 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 16 implements applications other than, or in addition to, a CRM application. For example, system 16 may provide tenant access to multiple hosted (standard and custom) applications, including a CRM application. User (or third party developer) applications, which may or may not include CRM, may be supported by the application platform 18, which manages creation, storage of the applications into one or more database objects and executing of the applications in a virtual machine in the process space of the system 16.

One arrangement for elements of system 16 is shown in FIG. 1, including a network interface 20, application platform 18, tenant data storage 22 for tenant data 23, system data storage 24 for system data 25 accessible to system 16 and possibly multiple tenants, program code 26 for implementing various functions of system 16, and a process space 28 for executing MTS system processes and tenant-specific processes, such as running applications as part of an application hosting service. Additional processes that may execute on system 16 include database indexing processes.

Several elements in the system shown in FIG. 1 include conventional, well-known elements that are explained only briefly here. For example, each user system 12 could include a desktop personal computer, workstation, laptop, PDA, cell phone, or any wireless access protocol (WAP) enabled device or any other computing device capable of interfacing directly or indirectly to the Internet or other network connection. User system 12 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 12 to access, process and view information, pages and applications available to it from system 16 over network 14. Each user system 12 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 16 or other systems or servers. For example, the user interface device can be used to access data and applications hosted by system 16, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 12 and all of its components are operator configurable using applications, such as a browser, including computer code run using a central processing unit such as an Intel Pentium® processor or the like. Similarly, system 16 (and additional instances of an MTS, where more than one is present) and all of their components might be operator configurable using application(s) including computer code to run using a central processing unit such as processor system 17, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 16 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments of the present invention can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 16 is configured to provide webpages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 2:
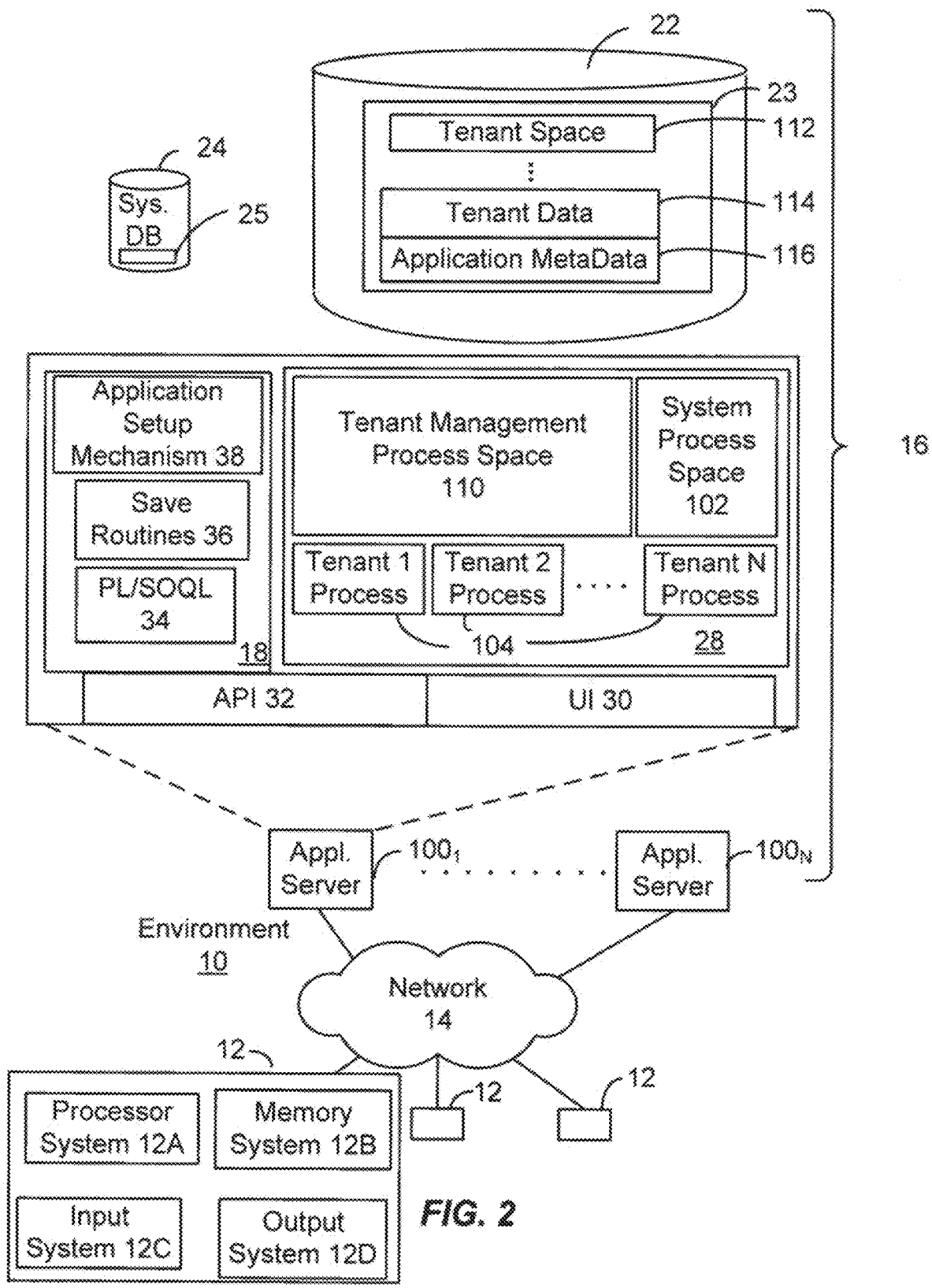
FIG. 2 illustrates elements of FIG. 1 and various possible interconnections between these elements in an embodiment.

FIG. 2 also illustrates environment 10. However, in FIG. 2 elements of system 16 and various interconnections in an embodiment are further illustrated. FIG. 2 shows that user system 12 may include processor system 12A, memory system 12B, input system 12C, and output system 12D. FIG. 2 shows network 14 and system 16. FIG. 2 also shows that system 16 may include tenant data storage 22, tenant data 23, system data storage 24, system data 25, User Interface (UI) 30, Application Program Interface (API) 32, PL/SOQL 34, save routines 36, application setup mechanism 38, applications servers $100_1$-$100_N$, system process space 102, tenant process spaces 104, tenant management process space 110, tenant storage area 112, user storage 114, and application metadata 116. In other embodiments, environment 10 may not have the same elements as those listed above and/or may have other elements instead of, or in addition to, those listed above.

User system 12, network 14, system 16, tenant data storage 22, and system data storage 24 were discussed above in FIG. 1. Regarding user system 12, processor system 12A may be any combination of one or more processors. Memory system 12B may be any combination of one or more memory devices, short term, and/or long term memory. Input system 12C may be any combination of input devices, such as one or more keyboards, mice, trackballs, scanners, cameras, and/or interfaces to networks. Output system 12D may be any combination of output devices, such as one or more monitors, printers, and/or interfaces to networks. As shown by FIG. 2, system 16 may include a network interface 20 (of FIG. 1) implemented as a set of HTTP application servers 100, an application platform 18, tenant data storage 22, and system data storage 24. Also shown is system process space 102, including individual tenant process spaces 104 and a tenant management process space 110. Each application server 100 may be configured to tenant data storage 22 and the tenant data 23 therein, and system data storage 24 and the system data 25 therein to serve requests of user systems 12. The tenant data 23 might be divided into individual tenant storage areas 112, which can be either a physical arrangement and/or a logical arrangement of data. Within each tenant storage area 112, user storage 114 and application metadata 116 might be similarly allocated for each user. For example, a copy of a user's most recently used (MRU) items might be stored to user storage 114. Similarly, a copy of MRU items for an entire organization that is a tenant might be stored to tenant storage area 112. A UI 30 provides a user interface and an API 32 provides an application programmer interface to system 16 resident processes to users and/or developers at user systems 12. The tenant data and the system data may be stored in various databases, such as one or more Oracle™ databases.

Application platform 18 includes an application setup mechanism 38 that supports application developers' creation and management of applications, which may be saved as metadata into tenant data storage 22 by save routines 36 for execution by subscribers as one or more tenant process spaces 104 managed by tenant management process 110 for example. Invocations to such applications may be coded using PL/SOQL 34 that provides a programming language style interface extension to API 32. A detailed description of some PL/SOQL language embodiments is discussed in commonly owned U.S. Provisional Patent Application 60/828,192 entitled, PROGRAMMING LANGUAGE METHOD AND SYSTEM FOR EXTENDING APIS TO EXECUTE IN CONJUNCTION WITH DATABASE APIS, by Craig Weissman, filed Oct. 4, 2006, which is incorporated in its entirety herein for all purposes. Invocations to applications may be detected by one or more system processes, which manages retrieving application metadata 116 for the subscriber making the invocation and executing the metadata as an application in a virtual machine.

Each application server 100 may be communicably coupled to database systems, e.g., having access to system data 25 and tenant data 23, via a different network connection. For example, one application server $100_1$ might be coupled via the network 14 (e.g., the Internet), another application server $100_{N-1}$ might be coupled via a direct network link, and another application server $100_N$ might be coupled by yet a different network connection. Transfer Control Protocol and Internet Protocol (TCP/IP) are typical protocols for communicating between application servers 100 and the database system. However, it will be apparent to one skilled in the art that other transport protocols may be used to optimize the system depending on the network interconnect used.

In certain embodiments, each application server 100 is configured to handle requests for any user associated with any organization that is a tenant. Because it is desirable to be able to add and remove application servers from the server pool at any time for any reason, there is preferably no server affinity for a user and/or organization to a specific application server 100. In one embodiment, therefore, an interface system implementing a load balancing function (e.g., an F5 Big-IP load balancer) is communicably coupled between the application servers 100 and the user systems 12 to distribute requests to the application servers 100. In one embodiment, the load balancer uses a least connections algorithm to route user requests to the application servers 100. Other examples of load balancing algorithms, such as round robin and observed response time, also can be used. For example, in certain embodiments, three consecutive requests from the same user could hit three different application servers 100, and three requests from different users could hit the same application server 100. In this manner, system 16 is multitenant, wherein system 16 handles storage of, and access to, different objects, data and applications across disparate users and organizations.

As an example of storage, one tenant might be a company that employs a sales force where each salesperson uses system 16 to manage their sales process. Thus, a user might maintain contact data, leads data, customer follow-up data, performance data, goals and progress data, etc., all applicable to that user's personal sales process (e.g., in tenant data storage 22). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 16 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 16 might also maintain system level data usable by multiple tenants or other data. Such system level data might include industry reports, news, postings, and the like that are sharable among tenants.

In certain embodiments, user systems 12 (which may be client systems) communicate with application servers 100 to request and update system-level and tenant-level data from system 16 that may require sending one or more queries to tenant data storage 22 and/or system data storage 24. System 16 (e.g., an application server 100 in system 16) automatically generates one or more SQL statements (e.g., one or more SQL queries) that are designed to access the desired information. System data storage 24 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to the present invention. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Tenant Process

Figure 3:
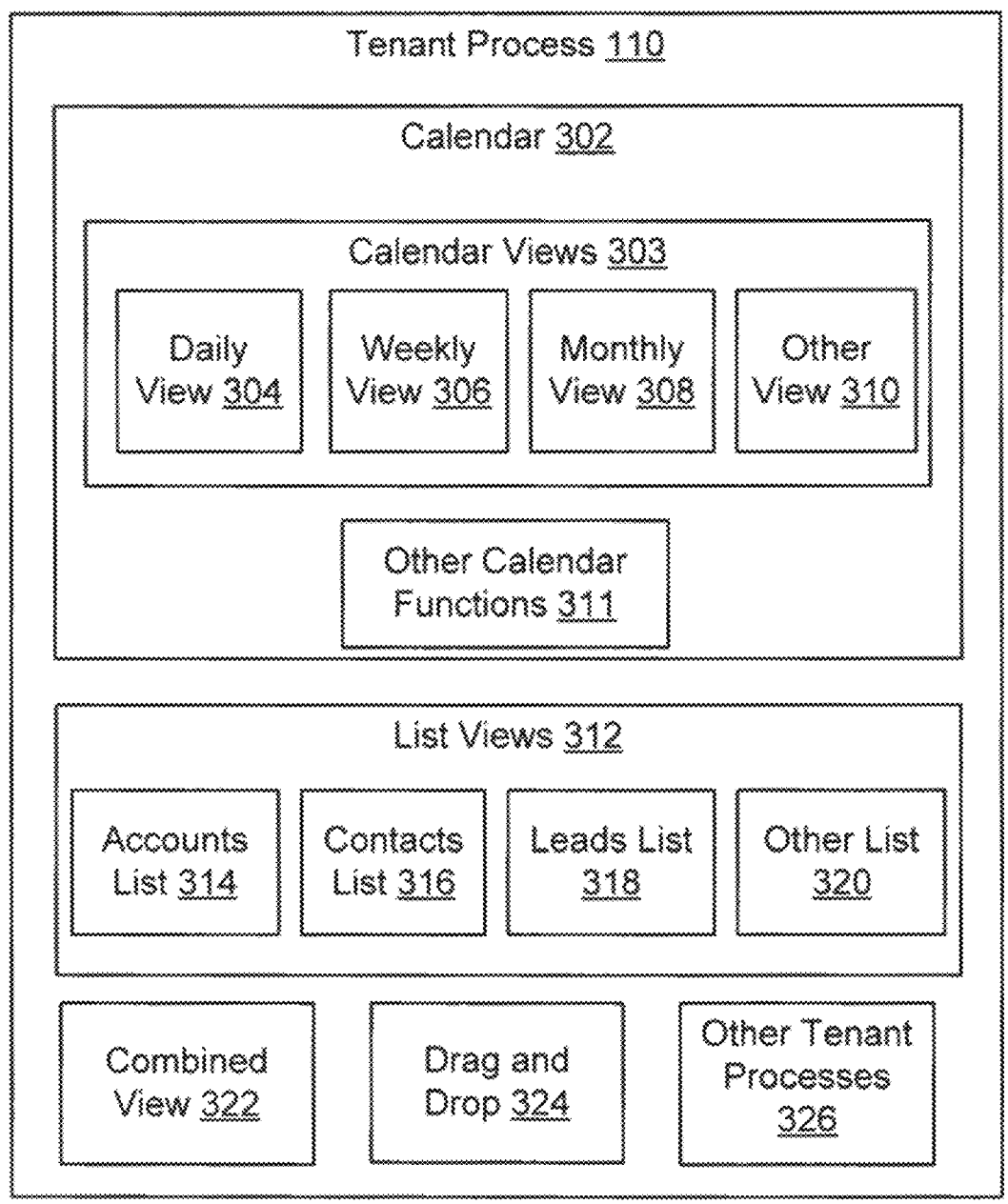
FIG. 3 shows a block diagram of an embodiment of the tenant process of FIG. 2.

FIG. 3 shows a block diagram of an embodiment of tenant process 110. Tenant process 110 may include calendar 302 having calendar views 303 and other calendar functions 311. Calendar views 303 may include daily view 304, weekly view 306, monthly view 308, and other view 310. Tenant process 110 may also include list views 312 having accounts list 314, contacts list 316, leads list 318, and other list 320. Tenant process 110 may further include combined view 322, drag and drop 324, and other tenant processes 326. In other embodiments, tenant process 110 may not have all of the elements listed and/or may have other elements instead of or in addition to those listed.

Calendar 302 is an application that presents a graphical calendar display to the user or to multiple users. Calendar 302 may indicate when previously scheduled events occur and/or when scheduled tasks are due. Calendar 302 may include a feature that allows an event to be dragged and dropped to another date. For example, if an event is initially scheduled for Dec. 4, 2009, and the user decides to reschedule the event, the user may use a pointing device, such as a mouse, touch pad, or track ball to select the event, drag the event to another day, such as Dec. 7, 2009, and drop the event on that date (e.g., by (1) selecting the event with a single click of the pointing device, (2) while holding the click of the pointing device, moving the pointing device cursor over the desired time, and (3) dropping the event onto the desired time by releasing the pointing device click), thereby completing rescheduling the event for Dec. 7, 2009. Other calendar functions 311 may include any of a number of other calendaring functionality.

Calendar views 303 may have options for viewing the information in calendar 302 in different formats, such as daily view 304, weekly view 306, monthly view 308, and other view 310. Daily view 304 is a detailed view of a user's daily schedule for any given day, indicating his or her availability for scheduling new events for the day and also indicating when previously scheduled events occur. For example, daily view 304 may display a period from 5 A.M. to 9 P.M. in hourly blocks showing the user's upcoming events for the day. In another embodiment, daily view 304 may display a period from 12 A.M. to 12 A.M the following day. Daily view 304 enables the user to determine whether he or she has any conflicting events before scheduling new events to the calendar for a given block of time.

Weekly view 306 is a detailed view of a user's weekly schedule, indicating his or her availability for event scheduling. For example, weekly view 306 may display a period from Monday thru Friday in hourly blocks and show the user's upcoming events for the week. Weekly view 306 may remind the user to keep an upcoming appointment by indicating that a previously scheduled meeting will be taking place on Wednesday afternoon. In another embodiment, weekly view 306 may display a period from Sunday to Saturday to include weekend availability in weekly view 306. Weekly view 306 enables the user to get an overview of all the upcoming events for the week and to determine when he or she is available for scheduling additional events for the week.

Monthly view 308 is a detailed view of a user's monthly schedule, indicating his or her previously scheduled events for the month. For example, monthly view 308 may display the entire month of October with each day displayed as its own block. Each block may or may not contain an event depending on whether an event was previously scheduled for the corresponding calendar date. In another embodiment, monthly view 308 may display only weekdays for the entire month of October, where the user does not schedule events on weekends.

Other view 310 is a detailed view of a user's schedule in any configuration which best meets the user's needs. For example, other view 310 may display only weekdays between 9 A.M. and 11 A.M., when the user may prefer to schedule events. In another embodiment, other view 310 may display only the days or hourly blocks when the user has available time for scheduling new events. In yet another embodiment, other view 310 may allow the user to fully configure the calendar to be displayed in such a way as to be most convenient to the user for determining availability to schedule events.

List view 312 is an application that presents an organized list of data to the user. List view 312 may include organized data such as name, address, state, city, company, phone number, email, status, and/or title, which for example may be organized in the format of a list of information where each line of the list has multiple columns containing different pieces of information. For example, one line of the list may have four columns, where the first column contains a contact name, two columns are used for an address, and a fourth column for a phone number. List view 312 may include features to edit, delete, or organize data. For example, if a contact is initially listed with a company name, phone number, and address, the listed information no longer being current, the user may select the contact and enter new information as appropriate. In another embodiment, list view 312 may also allow the user to organize contacts by alphabetical order, company name, location, or by any other organizing convention most suitable to the user's needs.

List view 312 may include accounts list 314, contacts list 316, leads list 318, and other list 320. Accounts list 314 is a record of data related to accounts. Accounts list 314 may include account details such as prior sales data, company name, name of a contact individual, phone number, company location, etc. Contacts list 316 is a record of data related to contacts. Contacts list 316 may include contact details such as a contact's first and last name, office and mobile phone numbers, physical address, title, and electronic mail address. Leads list 318 is a record of the user's leads for potential new customers, clients, or accounts and may include similar details to contacts and accounts lists. Other list 320 is a record of any other information the user may have organized to provide sales assistance or any other data organized for use.

Combined view 322 is provided to allow the simultaneous viewing of a calendar view 302 and a list view 312. In an embodiment, unlike other calendaring applications, a detailed list of contact information is presented to the user along with a detailed display of a user's scheduled availability. Prior to the combined view feature, a detailed calendar view and a list of contact information were not presented in one easy-to-use screen, where the user can interact with contact information and determine when the user is free and/or busy. This required users to perform multiple clicks and navigate multiple screens to accomplish at least certain common tasks related to the scheduling of new events on a calendar associated with a multi tenant database and/or a system for managing financial or other services. Consequently, scheduling events took longer than necessary, with only a non-detailed month view being provided, making it difficult to view previously scheduled events and evaluate at which times the user is busy and/or free before scheduling a new event. With combined view 322, the time required to schedule an event is reduced. For example, the user may have a list view open to identify and contact potential business, qualify opportunities, and schedule follow up meetings. By selecting a calendar view 302, combined view 322 allows the user to open the selected calendar view inline with the already opened list view, allowing simultaneous viewing of a detailed schedule and list view within the same screen. Although not readily apparent prior to engineering such an application, the simultaneous viewing of a list view and calendar view can reduce the clicks and screen changes required to schedule an event by seventy and eighty percent, respectively.

Drag and drop 324 is a feature provided to allow a user to easily transfer data from one view to another. Prior to adding the drag and drop feature, users were required to navigate to a new page and enter or reenter relevant information associated with scheduling or rescheduling an event on a calendar associated with a multi tenant database and/or a system for managing financial or other services. Consequently, scheduling events took longer than necessary, with users being required to reenter information already previously entered. With drag and drop 324, a user may schedule an event with a contact by using a pointing device, such as a mouse, touch pad, or track ball to select a contact from an open list view and drag the contact to an open calendar view. By simply dropping the contact onto a desired time, the event is scheduled. In an embodiment, the information about the contact that was dropped into the calendar may now also be available to the user while viewing the event that was scheduled. In an embodiment, a user may alternatively or additionally use drag and drop 324 to reschedule an event by dragging a previously scheduled event and dropping it onto a new time. Other tenant processes 324 may include any of a number of other tenant processes.

Server-Side Method of Scheduling an Event

Figure 4:
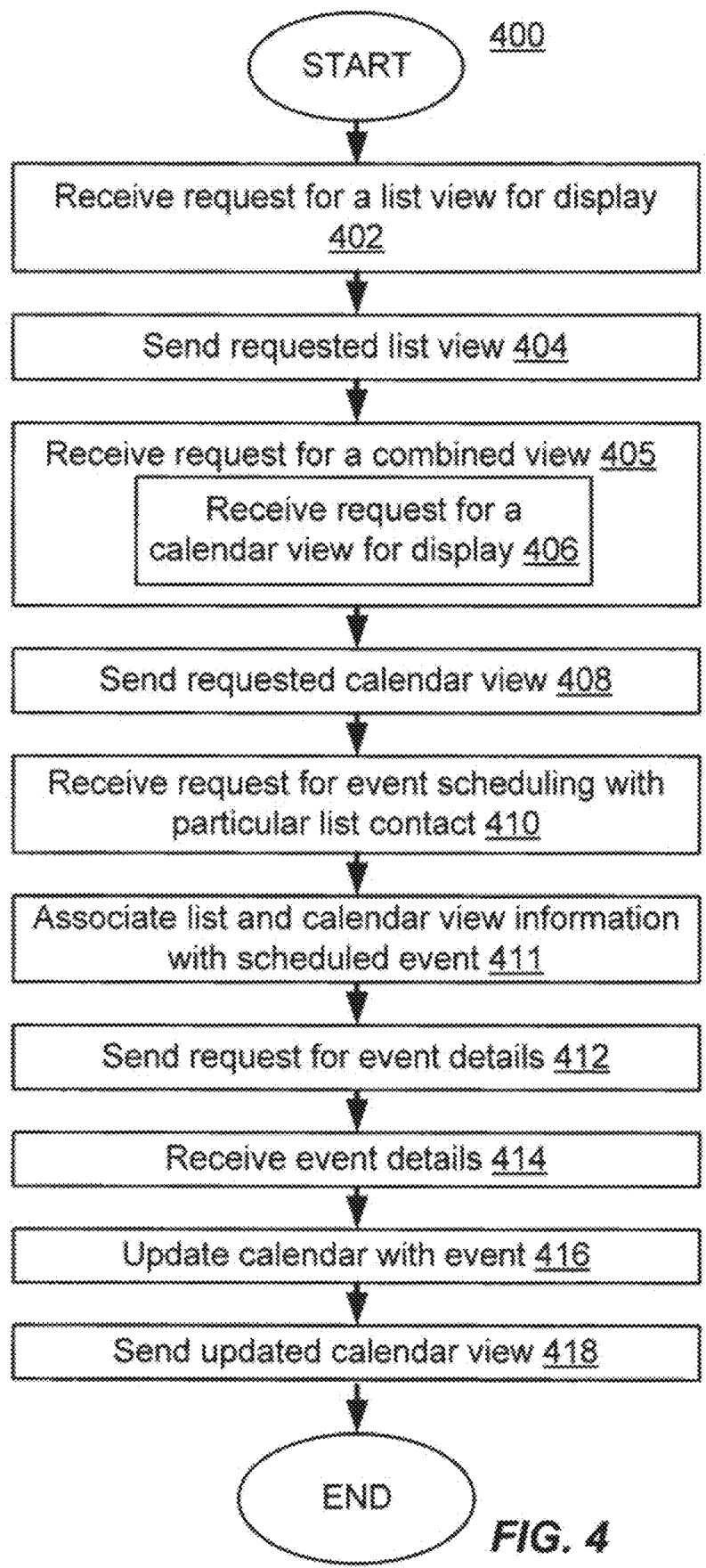
FIG. 4 shows a flowchart of an embodiment of a method for scheduling an event implemented at the server.

FIG. 4 shows a flowchart of an embodiment of a method for scheduling an event implemented at the server. In step 402, system 16 may receive a request for a list view of contacts to be displayed on user system 12. In step 404, in response to the request, system 16 sends a list view of contacts, which may be in the form of accounts list 314, contacts list 316, leads list 318 and/or other list 320, to user system 12 (and user system 12 receives the list view of contacts for display as will be discussed in conjunction with the client side method of FIG. 5). In step 405, system 16 may receive a request for a combined view. Step 405 may include a sub-step, which may be step 406. In step 406, system 16 receives a request for a calendar view from user system 12 while still retaining the list view. In an embodiment, the server may first send the calendar view to the user and then send the list view to the user or may send them both simultaneously. In step 408, in response to the user request, system 16 sends a calendar view, which may be in the form of daily view 304, weekly view 306, monthly view 308, and/or other view 310, to user system 12 for display (and user system 12 receives the calendar view for display as will be discussed in conjunction with the client side method of FIG. 5). In step 410, system 16 receives a request from user system 12 to schedule an event. The request includes information corresponding to signals created as a result of a drag and drop action performed by the user that result from the user dragging and dropping contact data from an open list view onto a desired calendar position in an open calendar view. For example, the request may contain the signals that are produced as a result of the pointing device performing the dragging and dropping action. As another example, the request may contain a representation of an item in list view being selected, a representation of the pointing device being moved from a set of coordinates corresponding to a first location within the webpage where item was selected to a second location on the webpage corresponding to the event date and time in the calendar view, while the pointing device is in the selected configuration. The selected configuration is the configuration of the pointing device while the pointing device is selecting an item (e.g., for a mouse with two buttons, the left button may be depressed). In step 411, system 16 associates information with the event based on the list view information that was dragged and dropped onto the calendar view and based on the location within the calendar view to which the information was dragged and dropped. For example, if a list view contact is dropped onto the calendar view, list view contact information such as contact name, contact owner, phone number, as well as calendar view information such as day of the week and time of day is associated with the event. As another example, if a list view account is dropped onto the calendar view, list view account information such as company name, contacts available at the company, account owner, as well as calendar view information such as day of the week and time of day is associated with the event. In step 412, optionally, system 16 sends a request for additional event details such as location of the event, subject of the event, or description. The request may include information that is automatically filled in, such as the time and date of the event and some or all of the list view information that was dragged and dropped, so that the user can verify the dragged and dropped information is correct. For example, system 16 may send the user a webpage having a form with some editable fields filled in based on the dragging and dropping and other fields that are left blank for the user to fill in. In step 414, system 16 receives the additional event details from user system 12. In step 416, system 16 updates the calendar with the newly schedule event and additional event details. In Step 418, system 16 sends the updated calendar view to user system 12 for display.

In an embodiment, each of the steps of method 400 is a distinct step. In another embodiment, although depicted as distinct steps in FIG. 4, steps 402-418 may not be distinct steps. In other embodiments, method 400 may not have all of the above steps and/or may have other steps in addition to, or instead of, those listed above. The steps of method 400 may be performed in another order. Subsets of the steps listed above as part of method 400 may be used to form their own method.

User-Side Method of Scheduling an Event

Figure 5:
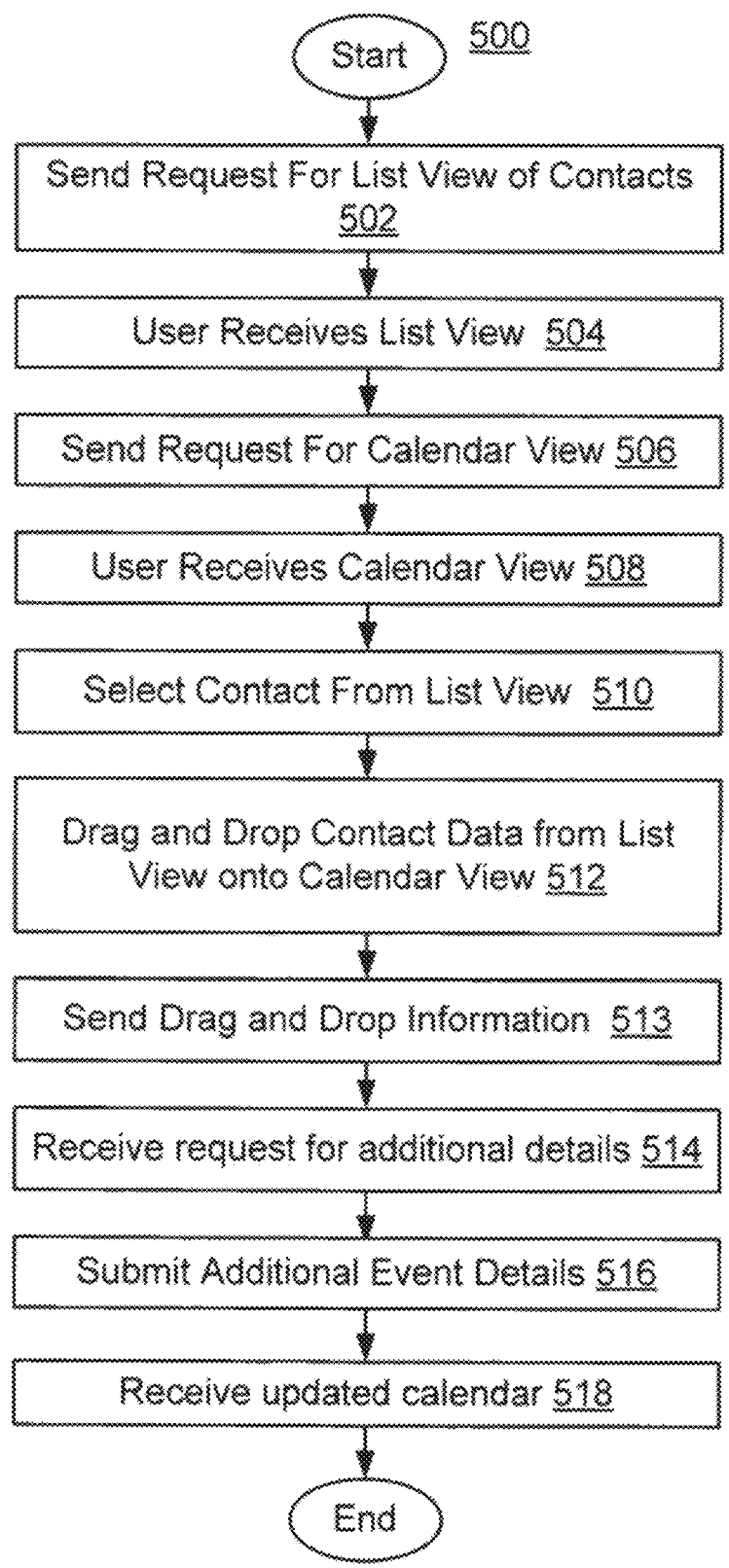
FIG. 5 shows a flowchart of an embodiment of a method for scheduling an event implemented on the user side.

FIG. 5 shows a flowchart of an embodiment of a method for scheduling an event implemented on the user side. In step 502, the user may request to receive a list view of contacts from system 16. In step 504, user system 12 receives a list view of contacts or any other view from system 16, which may be an accounts list 314, contacts list 316, leads list 318, or other list 320. In step 506, the user may send a request to receive a calendar view from system 16. The calendar view may be a daily view 304, weekly view 306, monthly view 308, or other view 310, depending on the view requested by the user. In step 508, in response to the user's request, user system 12 receives the requested calendar view from system 16. In step 510, by using a pointing device, the user may select a contact or other information from an open list view. The user may choose to schedule an event with a contact based on a potential sale, a business meeting, negotiations or for any other purpose. For example, the user may select information from a view having information about contacts, sales leads, accounts, and/or any other information. In step 512, the user drags the selected contact from an open list view to an open calendar view and drops the contact at a desired time for scheduling an event. By simply dropping the contact onto a desired time, the user has scheduled an event. In step 513, upon completing the dragging and dropping, user machine 12 sends the drag drop information to system 16. In step 514, in response, user machine 12 receives an updated webpage that may include a request for additional event details. The request may include information that is automatically filled in, such as the time and date of the event and some or all of the list view information that was dragged and dropped, so that the user can verify that information dragged and dropped is correct. For example, user system 12 may receive a webpage having a form with some editable fields filled in based on the dragging and dropping and other fields that are left blank for the user to fill in. In step 516, in response to the request from system 16, the user may optionally send, via user machine 12, additional event details or the user may elect not to supply additional details and simply save the event as-is. In step 518, user system 12 receives an updated calendar view reflecting his or her schedule with the new event.

In an embodiment, each of the steps of method 500 is a distinct step. In another embodiment, although depicted as distinct steps in FIG. 5, steps 502-518 may not be distinct steps. In other embodiments, method 500 may not have all of the above steps and/or may have other steps in addition to, or instead of, those listed above. The steps of method 500 may be performed in another order. Subsets of the steps listed above as part of method 500 may be used to form their own method.

Figure 6:
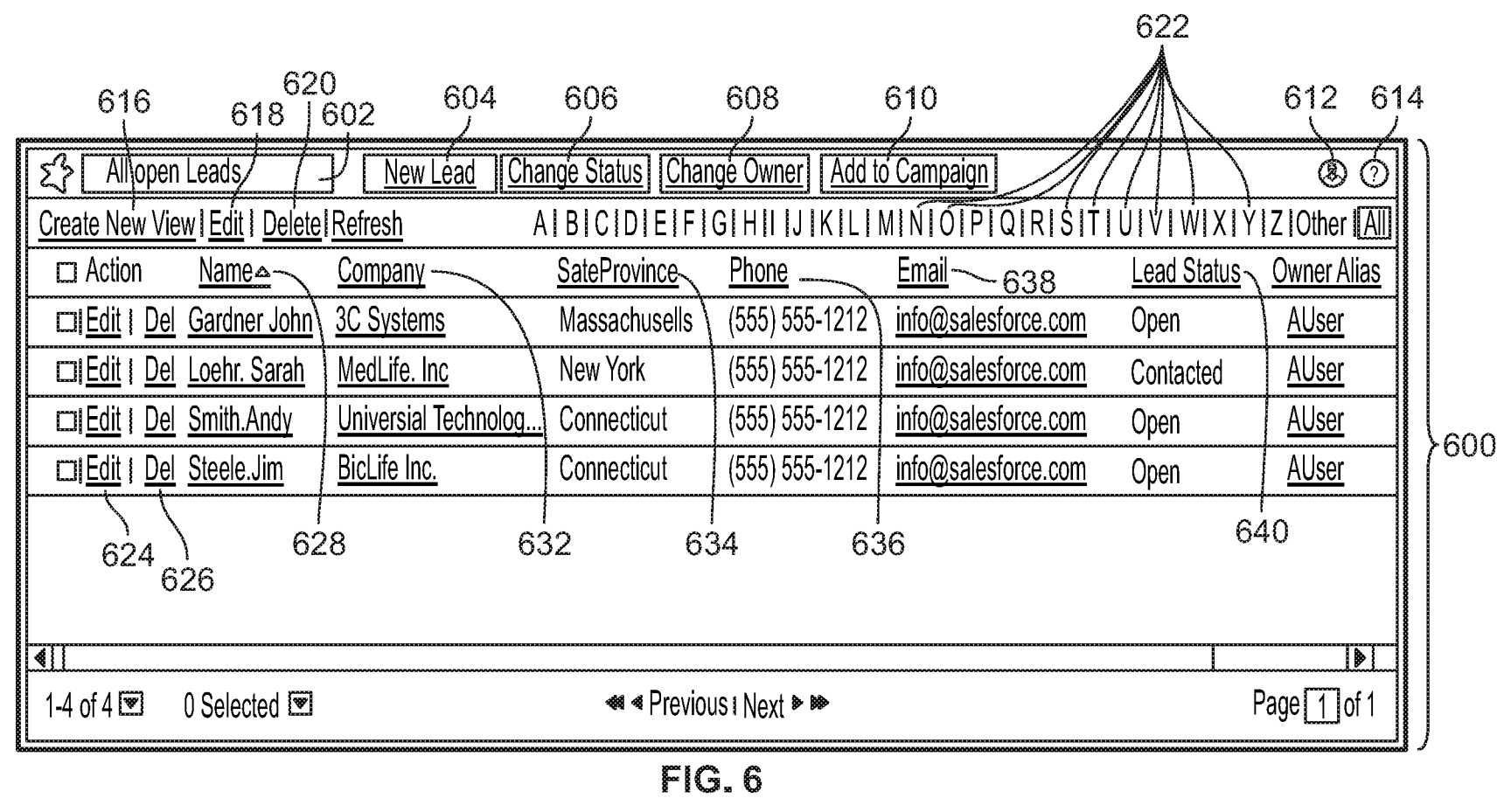

FIG. 6 is a screenshot of an embodiment of a list view 600. List view 600 may include drop-down menu 602, new contact button 604, change status button 606, change owner button 608, add to campaign button 610, print menu button 612, help button 614, create new view button 616, view edit button 618, view delete button 620, action 622, edit button 624, delete button 626, name 628, refresh 630, company 632, location 634, phone 636, email 638, and status 640. In other embodiments, list view 600 may not have all of the elements listed and/or may have other elements instead of or in addition to those listed.

List view 600 is an example of leads list 318. Although leads list 318 is used in the example of FIG. 6, list views for accounts list 314, contacts list 316, or other list 320 may also be used. Leads list 318, accounts list 314, contacts list 316 and other list 320 contain similar types of information. However, there may be differences in the information contained in the different list views. For example, accounts list 314 may not contain information for status 640 but may include information regarding account type such as whether the account is a partner account, customer account, or prospective account. As another example, contacts list 316 may not contain information for status 640 but may include information regarding the title of a contact such as buyer, president, vice president, chief engineer, etc.

Drop-down menu 602, when selected, allows the user to choose leads, contacts, or accounts for viewing which have been previously organized into designated categories. The categories may be designated as open, contacted, recently viewed, or any other organizational designation the user assigns to the categories. New button 604 may allow the user to add a new lead to the currently selected lead category. Optionally, new button 604 may allow the user to designate which lead category from drop-down menu 602 the user would like to place the new lead. Change status button 606 may allow the user to alter the status designated to a particular lead. For example, the user may have obtained information regarding a possible sales lead indirectly and initially assigned an open status to the lead. After contacting the lead, the user may change the status of the sales lead by using change status button 606 to assign a new status of contacted to the lead. Change status button 606 may allow the user to assign any status to the lead and optionally, add notes concerning the lead. For example, the user may assign a status of contacted to a lead and also add a note to follow-up with the lead in 15 days. Change owner button 608, when selected, may allow a user to alter the ownership designation of a lead. For example, if a lead originally was assigned to salesperson A and salesperson B made the contact and scheduled a meeting for a future time, by selecting change owner button 608, the user can designate the ownership of the lead to salesperson B. Add to campaign button 610, when selected, may allow the user to categorize a lead under a particular sales promotion or campaign. Categorizing the lead with a particular promotion or campaign may have added benefits to the user or lead. For example, the user may be entitled to special performance incentives based on a current sales campaign or a lead may be entitled to discounts and savings based on a current sales promotion for new customers. Print button 612, when selected, allows the user to print the list view currently being displayed or optionally, print only the desired portion of the list view. Help button 614 may provide the user with instructions detailing use of the particular list view currently selected. The instructions may explain the functionality of each of the links or buttons on the list view and how to input data to the list view. Additionally, help button 614 may allow the user to search for particular topics and may contain a list of commonly encountered problems which may be helpful to the user.

Create new view button 616, when selected, allows the user to create a new list view. View edit button 618, when selected, allows the user to edit view parameters. View delete button 620 allows the user to delete a list view. Arrangement 622 allows the user to view leads by alphabetical order. For example, selection of the letter T may recall all leads with last name beginning with the letter T. In an alternative embodiment, selection of the letter T may recall all leads with first name beginning with the letter T. Edit button 624 may allow the user to change particular information about a lead. For example, a user may wish to update the contact information for a lead which has changed employers or changed mobile numbers. Selecting the edit button 624 beside the desired lead allows the user to change the information in the particular data fields that the user wishes to update. Delete button 626 allows the user to discard a lead and its corresponding record from the system. Refresh button 628 allows the user to refresh the list view to display and reflect any recent changes made to the list view. For example, after contacting a lead and changing the lead status to contacted or adding a new lead, the user may select the refresh button to show the change in status of the contacted lead or to show the new lead in the list view. Name 630 is the name of the lead in the list view. Company 632 is the name of the company associated with the lead. Location 634 is the address of the lead or lead's company. Phone 636 is a contact number and may be an office, home or mobile number or any other number where the lead can be reached. Email 638 is an electronic address where lead can receive electronic mail. Status 640 is an indication of the status of a lead. For example, the user may have received a possible sales lead indirectly and initially assigned an open status to the lead. After contacting the lead, the user may change the status of the sales lead by using change status button 606 to assign a new status of contacted to the lead, lead status 640 indicating the status of the lead as contacted.

Figure 7:
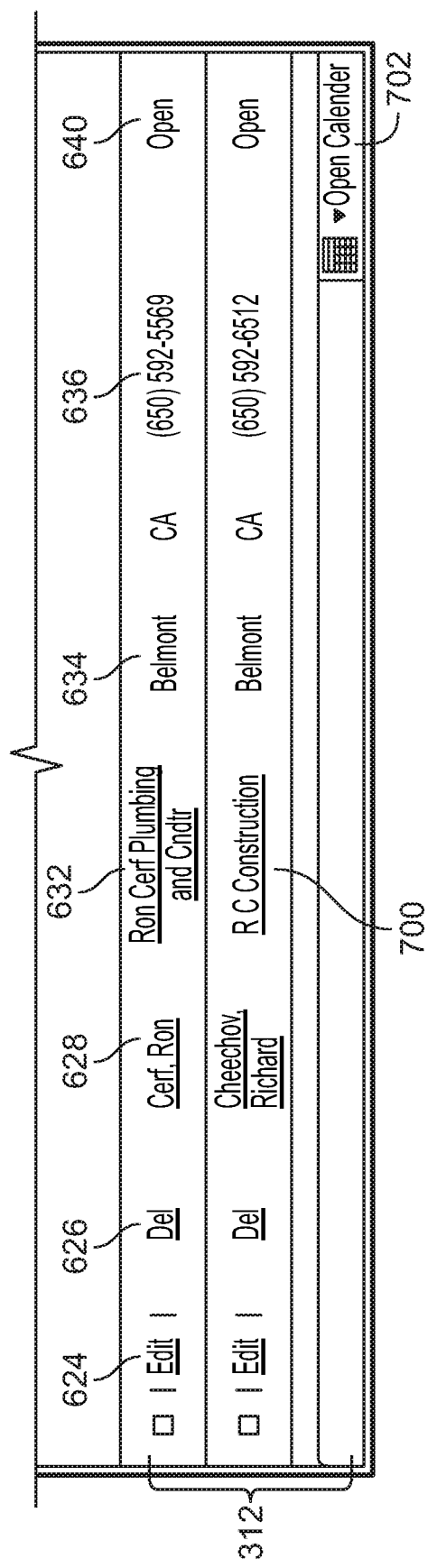
FIG. 7 is a close up screenshot of an embodiment of a list view.

FIG. 7 is a close up screenshot of an embodiment of a list view 700. In particular, list view 700 highlights open calendar view button 702. FIG. 7 also includes edit button 624, delete button 626, name 628, company 632, location 634, phone 636, and status 640, which were described above in conjunction with FIG. 6. In other embodiments list view 700 may not have all of the elements listed and/or may have other elements instead of or in addition to those listed.

Open calendar view button 702, when selected, may allow the user to open a calendar view inline with a presently displayed list view to facilitate efficiently scheduling an event. Optionally, open calendar view button 702, when selected, may prompt the user to choose the calendar view best suited for the user's needs, which may include daily view 304, weekly view 306, monthly view 308, or other view 310.

FIG. 8 is a screenshot of an embodiment of a combined view 322. In addition to features 602 thru 640 previously described in FIG. 6, combined view 322 also includes calendar owner 802, day of week 804, time 806, change calendar owner button 808, prior week 810, advance week 812, currently displayed 814, present week 816, show weekends 818, busy color key 820, out of office color key 822, lead created date 824, and previously scheduled events 826.

Combined view 322 depicts a leads list 318 inline with a weekly view 306. In an embodiment, after selecting open calendar view button 702, and choosing weekly view 306 for inline viewing, the screenshot of FIG. 8 is presented to the user. In an embodiment, any list view may be displayed inline with any calendar view. Calendar owner 802 identifies who the calendar belongs to. Day of week 804 indicates which days of the week scheduled events take place. Time 806 indicates at what time scheduled events take place. Change calendar owner button 808 allows the user to assign a new owner to a calendar. Prior week 810 provides the user the ability to adjust weekly view 306 to display a week prior to the week currently displayed. Advance week 812 provides the user the ability to advance the week currently displayed to the following week. Currently displayed 814 indicates to the user the days currently being displayed in the current calendar view. For example, if the user has selected a weekly view 306, currently displayed 814 may indicate a date range of May 1 through May 5. In another embodiment, currently displayed 814 may indicate a date range of May 1 through May 7. In yet another embodiment, if the user has selected daily view 304, currently displayed 814 may indicate the date currently displayed as May 1, 2010. Present week button 816 may allow the user to return to a display of the current week. For example, if the user has advanced the calendar using advance week 812 or moved back to a previous week using prior week 810, by selecting present week button 816, the user can return to the calendar display of the present week. Alternatively, if the calendar view chosen is a daily view or monthly view, user may return to the present day or present month by selecting a corresponding present day button or present month button, respectively. Show weekends button 818 allows the user to optionally display weekends. For example, if the user only has a calendar view displaying Monday thru Friday and determines a Saturday appointment is necessary, selecting show weekends button 818 will allow the user to quickly view and determine his weekend availability. Busy color key 820 indicates to the user on an inline calendar view he or she has an event scheduled for a particular time frame and is therefore busy at that time. Out of office color key 822 indicates to the user on an inline calendar view that he or she is out of the office and therefore unavailable for a particular time frame. Lead created date 824 indicates when the lead was added to the lead list. Previously scheduled events 826 show the user when future events will take place.

FIG. 9 is a screenshot of an embodiment of a list view inline with a calendar view. FIG. 9 and FIG. 8 contain the same elements with the exception that FIG. 9 illustrates the selection of a contact from the list view for scheduling an event on the calendar view. Highlighted contact 902 is a contact selected by the user for future event scheduling. The user selects highlighted contact 902 by using a pointing device and selecting the contact. After having selected a contact, a box representing contact 902 appears that may be moved over the webpage having list view 800, allowing the user to drag and drop the highlighted contact 902 onto the inline, open, calendar view 303 to schedule a future event.

FIG. 10a is a screenshot of a list view inline with a calendar view highlighting an embodiment of an expanded dialogue box for scheduling an event. FIG. 10a and FIG. 8 contain the same elements, with FIG. 10a additionally containing event detail dialogue box 1002, event start date 1004, event end date 1006, event start time 1008, event end time 1010, event subject 1012, name 1014, event assignment 1016, event location 1018, calendar color designation 1020, contact designation 1022, opportunity 1024, edit details 1026, save details 1028, and cancel 1030. In other embodiments, event detail dialogue box 1002 may not have all of the elements listed and/or may have other elements instead of or in addition to those listed.

FIG. 10a highlights the expanded dialogue box that appears after the user has drag and dropped a highlighted contact 902 from a list view onto an inline calendar view. Event detail dialogue box 1002 appears in response to the user dragging and dropping a contact from a list view onto a calendar view. Event detail dialogue box 1002 has a number of fields. Some of the fields are empty, and some of the fields have been automatically filled in based on the information associated with the contact from the list view that was dragged and dropped and the date and time portion of the calendar view into which the contact was dragged and dropped. Elements 1004 thru 1030 are different fields into which the user may input additional details when scheduling an event. Some of the elements 1004 through 1030 are filled in automatically, which the user may edit. Event start date 1004 is a field that is automatically filled with the date the event starts, which the user may edit. Event end date 1006 is a field that is automatically filled in, that the user may edit by entering the date that the event ends. Event start time 1008 is a field that is automatically filled in, that the user may edit by entering the time the event is expected to begin. Event end time 1010 is a field that is automatically filled in, that the user may edit by entering the time the event is expected to end. Event subject 1012 is a field that prompts the user to enter a subject for the event. For example, event subject field 1012 may contain the reason for the event such as a company anniversary, a promotion party, reaching a sales goal celebration, or anything else the user designates as the event subject. Name 1014 is the name of the contact the user has dragged and dropped from the open list view, which is automatically filled in. Event assignment 1016, which may be automatically filled in, designates who the scheduled event is designated to. For example, salesperson A may have contacted and scheduled the event but salesperson B is to attend the event. Salesperson A may use event assignment 1016 to assign salesperson B to the event. Event location 1018 is where the event will take place. Calendar designation 1020 indicates by color code on the calendar whether the user is busy or out of the office. Being able to see the calendar view while scheduling the event, may assist in preventing conflicts. Contact designation 1022 is a drop down menu that allows assigning a designation to the adjacent name 1014, which may also be automatically selected as a result of the dragging and dropping. For example, if name 1014 is the name of a potential business lead, the user could use contact designation 1022 to designate the name as a lead. Relationship 1024 is a drop down menu, which may also have an initial selection automatically chosen as a result of the dragging and dropping. Relationship 1024 allows the user to further categorize the event into predetermined categories such as account, asset, campaign, case, contract, opportunity, product, solution, and others. For example, the user may have scheduled an event with a customer to discuss potential sales based on a promotional sales campaign. The user can use the drop down menu of relationship 1024 to designate the event as sales campaign. Additional detail 1026 is used to provide added information regarding relationship 1024. For example, if the user schedules an event with a contact that currently has an open account, the user may select account from the relationship 1024 drop down menu and then enter account information into additional detail 1026. Edit details 1028 is selected by the user to edit details regarding the scheduled event. Save details 1030 is selected by the user upon completion of editing event details. Cancel 1032 allows the user to cancel his selection of edit event details and proceed with the prior entered information.

Figure 10B:
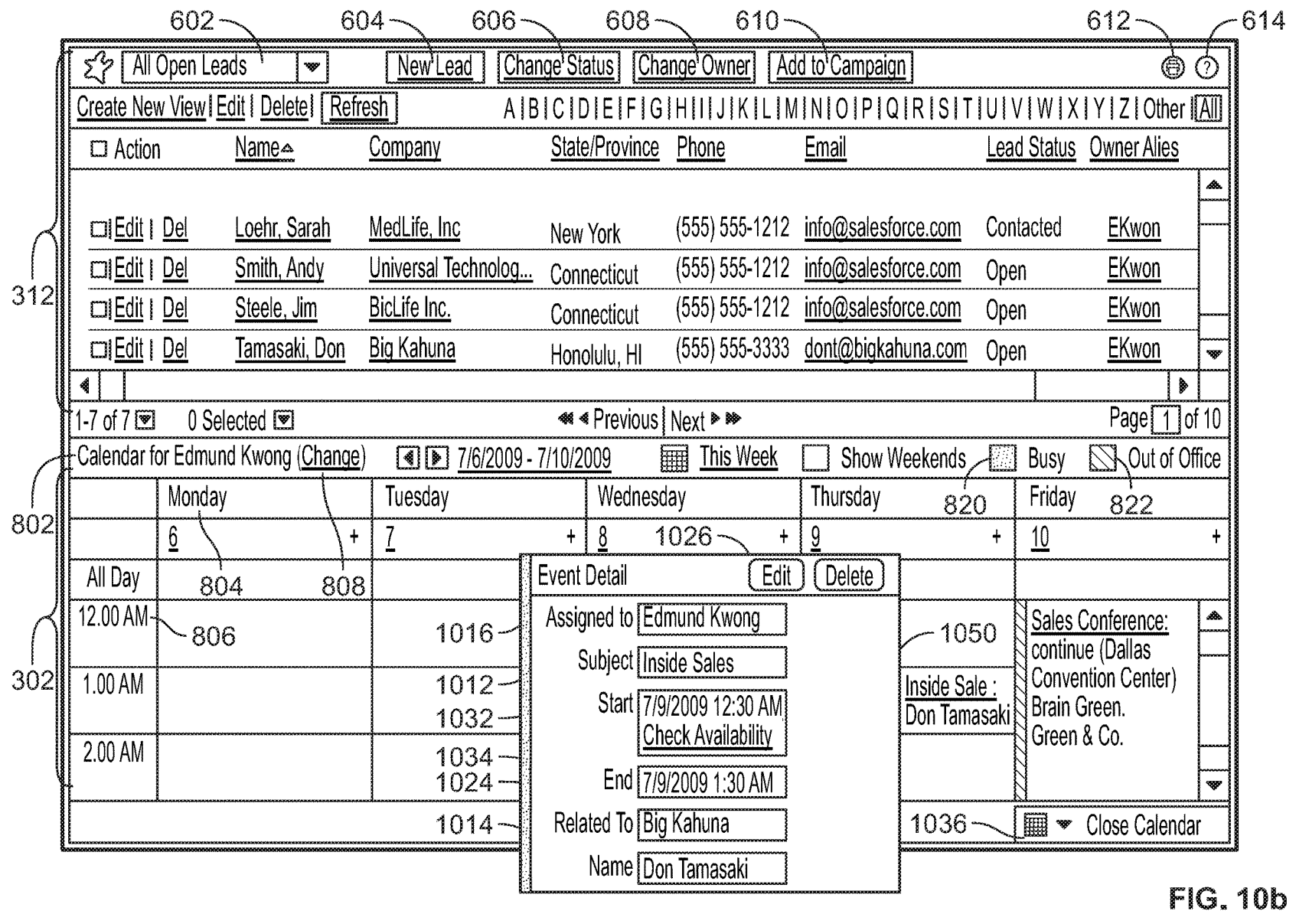

FIG. 10b is a screenshot of an embodiment of an event detail dialogue box for an existing scheduled event, which is event detail dialogue box 1050. FIG. 10b contains the same elements as described in FIG. 3, FIG. 6, FIG. 8 and FIG. 10a but additionally includes event begin 1032, event finish 1034 and close calendar button 1036. In other embodiments, event detail dialogue box 1050 may not have all of the elements listed and/or may have other elements instead of or in addition to those listed.

FIG. 10b contains the same elements as described in FIG. 3, FIG. 6, FIG. 8 and FIG. 10a except that certain elements of event detail dialogue box 1002 are omitted or have been combined to form a single field and new element close calendar button 1036 has been added. Event begin 1032 combines event start date 1004 and event start time 1008 of FIG. 10*a* to form a single field that conveys the same information. Event finish 1034 combines event end date 1006 and event end time 1010 of FIG. 10*a* to also form a single field that conveys the same information. Close calendar button 1036 allows the user to close the current calendar view.

Event detail dialogue box 1050, may appear whenever the user hovers a pointing device over a scheduled event on a calendar view. Event detail dialogue box 1050 displays to the user the details of an existing scheduled event. By moving the pointing device over any previously scheduled event, the user may get details of the event. This may aid the user in better evaluating availability by giving them details of what surrounds a scheduled event. For example, by positioning the pointing device over a business meeting scheduled to last one hour beginning at 10:30 A.M., the user may determine that a potential lunch meeting would be better scheduled for the afternoon since business meetings with the scheduled contact tend to run longer than planned.

Method for Using the Environment (FIGS. 1 and 2)

Figure 11:
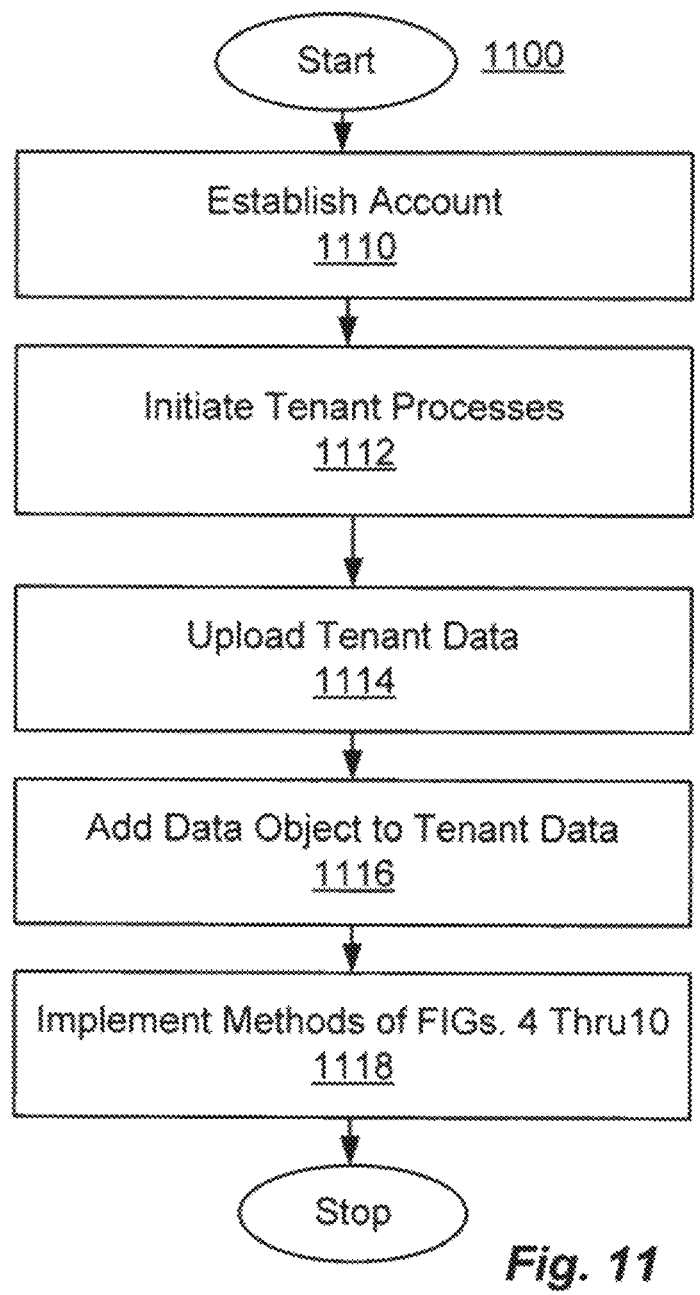
FIG. 11 shows a flowchart of an example of a method of using the environment of FIGS. 1 and 2.

FIG. 11 shows a flowchart of an example of a method 1100 of using environment 10 in FIG. 2. In step 1110, user system 12 (FIGS. 1 and 2) establishes an account. In step 1112, one more tenant process space 104 (FIG. 2) are initiated on behalf of user system 12, which may also involve setting aside space in tenant space 112 (FIG. 2) and tenant data 114 (FIG. 2) for user system 12. Step 1112 may also involve modifying application metadata to accommodate user system 12. In step 1114, user system 12 uploads data. In step 1116, one or more data objects are added to tenant data 114 where the data uploaded is stored. In step 1118, the methods associated with FIGS. 4-10 may be implemented. In another embodiment, although depicted as distinct steps in FIG. 11, steps 1110-1118 may not be distinct steps. In other embodiments, method 1100 may not have all of the above steps and/or may have other steps in addition to, or instead of, those listed above. The steps of method 1100 may be performed in another order. Subsets of the steps listed above as part of method 1100 may be used to form their own method.

Method for Creating the Environment (FIGS. 1 and 2)

Figure 12:
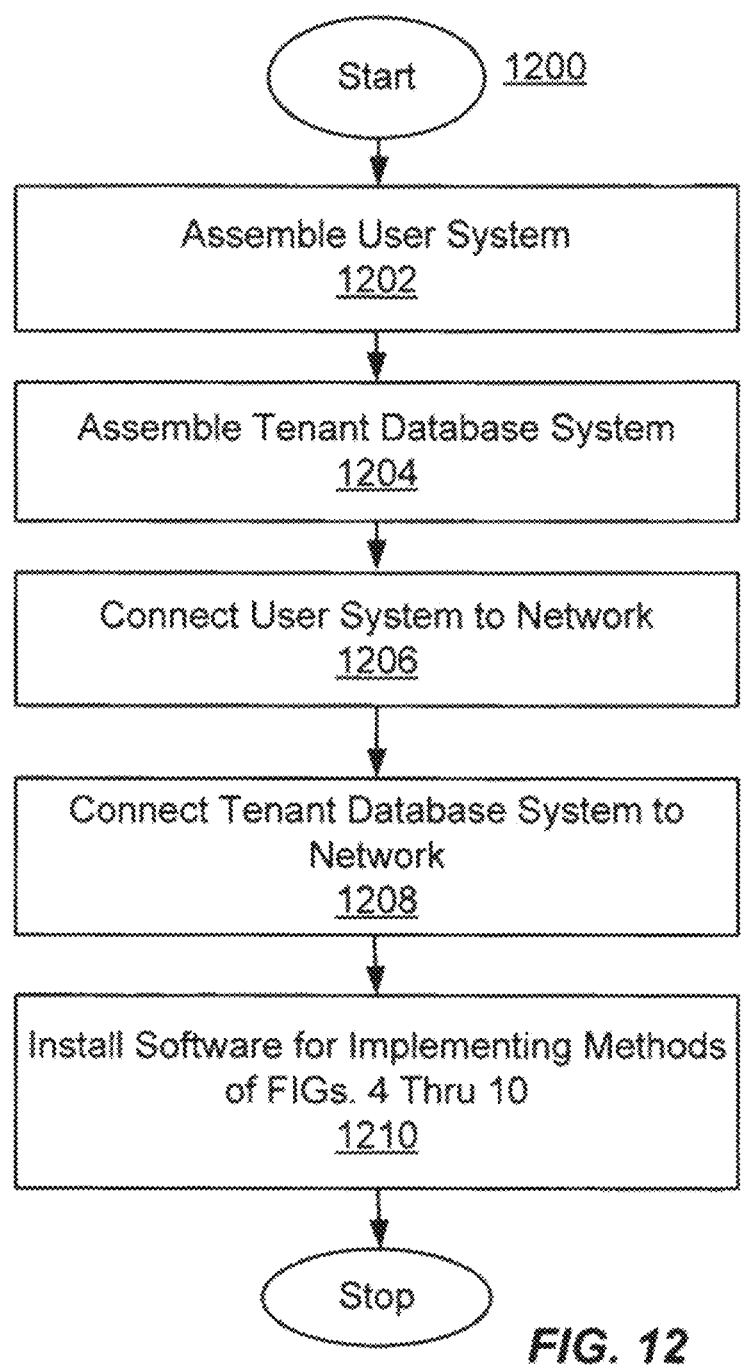
FIG. 12 shows a flowchart of an example of a method of making the environment of FIGS. 1 and 2.

FIG. 12 is a method of making environment 10, in step 1202, user system 12 (FIGS. 1 and 2) is assembled, which may include communicatively coupling one or more processors, one or more memory devices, one or more input devices (e.g., one or more mice, keyboards, and/or scanners), one or more output devices (e.g., one more printers, one or more interfaces to networks, and/or one or more monitors) to one another.

In step 1204, system 16 (FIGS. 1 and 2) is assembled, which may include communicatively coupling one or more processors, one or more memory devices, one or more input devices (e.g., one or more mice, keyboards, and/or scanners), one or more output devices (e.g., one more printers, one or more interfaces to networks, and/or one or more monitors) to one another. Additionally assembling system 16 may include installing application platform 18, network interface 20, tenant data storage 22, system data storage 24, system data 25, program code 26, process space 28, UI 30, API 32, PL/SOQL 34, save routine 36, application setup mechanism 38, applications servers 100$_1$-100$_N$, system process space 102, tenant process spaces 104, tenant management process space 110, tenant space 112, tenant data 114, and application metadata 116 (FIG. 2).

In step 1206, user system 12 is communicatively coupled to network 104. In step 1208, system 16 is communicatively coupled to network 104 allowing user system 12 and system 16 to communicate with one another (FIG. 2). In step 1210, one or more instructions may be installed in system 16 (e.g., the instructions may be installed on one or more machine readable media, such as computer readable media, therein) and/or system 16 is otherwise configured for performing the steps of methods associated with FIGS. 4-10. For example, as part of step 1210, one or more instructions may be entered into the memory of system 16 for inline scheduling of events including the ability to simultaneously view a list view and calendar view and drag and drop contacts from a list view to calendar view to schedule events. In an embodiment, each of the steps of method 1200 is a distinct step. In another embodiment, although depicted as distinct steps in FIG. 12, steps 1202-1210 may not be distinct steps. In other embodiments, method 1200 may not have all of the above steps and/or may have other steps in addition to, or instead of, those listed above. The steps of method 1200 may be performed in another order. Subsets of the steps listed above as part of method 1200 may be used to form their own method.

Extensions and Alternatives

In an alternative embodiment, event scheduling may be performed by selecting a desired calendar date and time from the calendar view, dragging the selection to the list view and dropping the calendar view information onto the desired list view contact information for scheduling a new event and/or to add information to the list view that was stored in association with the calendar view.

In an embodiment, inline scheduling in an on-demand service may allow comparing calendars of different users of the same tenant or even of different tenants (if appropriate permissions have been granted) to simplify the scheduling. In another alternative embodiment, a calendar view for a first individual and a second calendar view associated with a second individual may be simultaneously displayed within the same viewing screen. In an embodiment, event scheduling may be performed by selecting a previously scheduled event from the first calendar view belonging to the first individual, dragging the selection to the second calendar view belonging to the second individual and dropping the previously scheduled event onto the desired day and time for scheduling a new event on the second calendar view.

In an embodiment, inline scheduling in an on-demand service may allow simplified scheduling of events between different users of the same tenant or even different tenants (if appropriate permissions are granted).

In another alternative embodiment, event scheduling may be performed by first multi-selecting leads or contacts from an open list view and dragging and dropping them together onto an open calendar view. In an embodiment, the multi-selecting combined with the simultaneous dragging and dropping creates a group event with each of the multi-selected leads or contacts. In an embodiment, the multiselecting combined with the simultaneous dragging and dropping may allow simplified scheduling of group events by requiring the user to drag and drop multiple open list view leads or contacts only once.

Each embodiment disclosed herein may be used or otherwise combined with any of the other embodiments disclosed. Any element of any embodiment may be used in any embodiment.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A method for providing in-line scheduling by a server of a scheduling system of a multi-tenant database system, the method comprising:

receiving, at the server, a first user's request for a contact list of the first user, wherein the contact list is for being presented in a contact list view to show information about contacts and other information stored in the server of the multi-tenant database system;

after the receiving of the first user's request for the contact list, sending contents, representing the contact list, to be displayed in the contact list view for display to a user machine of the first user, wherein the contact list view displays the contacts and selectable buttons on a page, each contact includes the other information associated with the contact;

in response to a selection of one of the selectable buttons in the contact list view, opening a calendar view in-line and displaying with the contact list view on the page, wherein the calendar view includes information presented in a format of a calendar having a group of adjacent boxes that correspond to days of a week or days of a month, such that both the contact list view and the calendar view of the first user are distinct from one another and are viewable simultaneously on the page in a horizontal arrangement or a vertical arrangement;

receiving, at the server, a first user's request for calendar information of a second user for display in the calendar view that is distinct from the contact list view, the request for the calendar information of the second user having been initiated by a selection of one of the selectable buttons to the calendar view provided with the contact list view;

after receiving the first user's request for the calendar information initiated by the selection of one of the selectable buttons, sending the calendar information of the second user for display in the calendar view in-line with the contact list view in the page, wherein the calendar view changes displayed calendar information of the first user to the second user, such that both the contact list view of the first user and the calendar view of the second user are distinct from one another and are viewable simultaneously on the page in the horizontal arrangement or the vertical arrangement;

receiving, at the server, a drag and drop feature-generated request from the user machine of the first user to schedule an event, wherein the drag and drop feature-generated request to schedule the event includes (i) selecting a contact from the displayed contact list of the first user within the contact list view using a user interface device, (ii) moving and dropping the selected information to a second location, representing a portion of the calendar information of the second user, within the calendar view, and (iii) displaying a dialog box including a number of fields for scheduling an event;

scheduling, by the server, the event based on the received drag and drop feature generated request of the first user to schedule the event; and editing, at the server, one or more event details in one or more fields of the dialog box of the scheduled event based on at least one received input of the first user from the user interface device.

2. The method of claim 1, wherein multiple fields of the contact list view are viewable simultaneously with multiple fields of the calendar view.

3. The method of claim 1, wherein the receiving of the drag and drop feature-generated request of the first user includes receiving drag and drop information that is indicative of information related to when to schedule the event and information, that is to be associated with the event, from the contact list view.

4. The method of claim 1, further comprising receiving additional information regarding the event, as a result of an interaction with the dialogue box requesting event details and automatically filled in with information from the contact list view.

5. The method of claim 1, wherein the calendar view simultaneously provides for viewing the calendar information of the second user and calendar information of a third user.

6. The method of claim 1, wherein the calendar view simultaneously provides for viewing the calendar information of the second user and calendar information of the first user.

7. A method for in-line scheduling by a user machine of a scheduling system of a multi-tenant database system, the method comprising:

sending, to a server of the scheduling system, a first user's request for a contact list of the first user, wherein the contact list is for being presented in a contact list view to show information about contacts and other information stored in the server of the multi-tenant database system;

after the sending of the first user's request for the contact list, receiving contents representing the contact list, to be displayed in the contact list view for display by the user machine of the first user, wherein the contact list view displays the contacts and selectable buttons on a page, each contact includes other information associated with the contact;

in response to a selection of one of the selectable buttons in the contact list view, opening a calendar view in-line and displaying with the contact list view on the page, wherein the calendar view includes information presented in a format of a calendar having a group of adjacent boxes that correspond to days of a week or days of a month, such that both the contact list view and the calendar view of the first user are distinct from one another and are viewable simultaneously on the page in a horizontal arrangement or a vertical arrangement;

sending, to the server, a first user's request for calendar information of a second user for display in the calendar view by sending an indication of a selection of the one of selectable buttons to the calendar view provided with the contact list view;

after sending the first user's request for the calendar information based on the selection of the selectable button, receiving the calendar information of the second user for display in the calendar view in-line with the contact list view, wherein the calendar view changes displayed calendar information of the first user to the second user, such that both the contact list view of the first user and the calendar view of the second user are distinct from one another and are viewable simultaneously on the page in the horizontal arrangement or the vertical arrangement;

sending, to the server, a drag and drop feature-generated request from the user machine of the first user to schedule an event, wherein the drag and drop feature-generated request to schedule the event includes (i) selecting a contact from the displayed contact list of the first user within the contact list view using a user interface device, (ii) moving and dropping the selected information to a second location, representing a portion of the calendar information of the second user, within the calendar view, and (iii) displaying a dialog box including a number of fields for scheduling an event, such that the server can schedule the event based on the received drag and drop feature-generated request of the first user to schedule the event; and editing, at the server, one or more event details in one or more fields of the dialog box of the scheduled event based on at least one received input of the first user from the user interface device.

8. A non-transitory machine-readable medium storing thereon one or more instructions, which when implemented cause a processor to implement a method for providing in-line scheduling by a server of a scheduling system of a multi-tenant database system, the method comprising:

receiving, at the server, a first user's request for a contact list of the first user, wherein the contact list is for being presented in a contact list view to show information about contacts and other information stored in the server of the multi-tenant database system;

after the receiving of the first user's request for the contact list, sending contents, representing the contact list, to be displayed in the contact list view for display to a user machine of the first user, wherein the contact list view displays the contacts and selectable buttons on a page, each contact includes the other information associated with the contact;

in response to a selection of one of the selectable buttons in the contact list view, opening a calendar view in-line and displaying with the contact list view on the page, wherein the calendar view includes information presented in a format of a calendar having a group of adjacent boxes that correspond to days of a week or days of a month, such that both the contact list view and the calendar view of the first user are distinct from one another and are viewable simultaneously on the page in a horizontal arrangement or a vertical arrangement;

receiving, at the server, a first user's request for calendar information of a second user for display in the calendar view that is distinct from the contact list view, the request for the calendar information of the second user having been initiated by a selection of one of the selectable buttons to the calendar view provided with the contact list view;

after receiving the first user's request for the calendar information initiated by the selection of the one of the selectable buttons, sending the calendar information of the second user for display in the calendar view in-line with the contact list view, wherein the calendar view changes displayed calendar information of the first user to the second user, such that both the contact list view of the first user and the calendar view of the second user are distinct from one another and are viewable simultaneously on the page in the horizontal arrangement or the vertical arrangement;

receiving, at the server, a drag and drop feature-generated request from the user machine of the first user to schedule an event, wherein the drag and drop feature-generated request to schedule the event includes (i) selecting a contact from the displayed contact list of the first user within the contact list view using a user interface device, (ii) moving and dropping the selected information to a second location, representing a portion of the calendar information of the second user, within the calendar view, and (iii) displaying a dialog box including a number of fields for scheduling an event;

scheduling, by the server, the event based on the received drag and drop feature generated request of the first user to schedule the event; and editing, at the server, one or more event details in one or more fields of the dialog box of the scheduled event based on at least one received input of the first user from the user interface device.

9. The non-transitory machine-readable medium of claim 8, wherein multiple fields of the contact list view are viewable simultaneously with multiple fields of the calendar view.

10. The non-transitory machine-readable medium of claim 8, wherein the receiving of the drag and drop feature-generated request of the first user includes receiving drag and drop information that is indicative of information related to when to schedule the event and information, that is to be associated with the event, from the contact list view.

11. The non-transitory machine-readable medium of claim 8, further comprising receiving additional information regarding the event, as a result of an interaction with the dialogue box requesting event details and automatically filled in with information from the contact list view.

12. The non-transitory machine-readable medium of claim 8, wherein the calendar view simultaneously provides for viewing the calendar information of the second user and calendar information of a third user.

13. The non-transitory machine-readable medium of claim 8, wherein the calendar view simultaneously provides for viewing the calendar information of the second user and calendar information of the first user.

14. A server of a scheduling system of a multi-tenant database system, the server for providing in-line scheduling and comprising:

a processor; and a memory, wherein the memory includes one non-transitory machine readable medium, the memory carrying one or more sequences of instructions which when implemented causes the processor to implement a method including:

receiving, at the server, a first user's request for a contact list of the first user, wherein the contact list is for being presented in a contact list view to show information about contacts and other information stored in the server of the multi-tenant database system;

after the receiving of the first user's request for the contact list, sending contents, representing the contact list, to be displayed in the contact list view for display to a user machine of the first user, wherein the contact list view displays the contacts and selectable buttons on a page, each contact includes the other information associated with the contact;

in response to a selection of one of the selectable buttons in the contact list view, opening a calendar view in-line and displaying with the contact list view on the page, wherein the calendar view includes information presented in a format of a calendar having a group of adjacent boxes that correspond to days of a week or days of a month, such that both the contact list view and the calendar view of the first user are distinct from one another and are viewable simultaneously on the page in a horizontal arrangement or a vertical arrangement;

receiving, at the server, a first user's request for calendar information of a second user for display in the calendar view that is distinct from the contact list view, the request for the calendar information of the second user having been initiated by a selection of one of the selectable buttons to the calendar view provided with the contact list view;

after receiving the first user's request for the calendar information initiated by the selection of one of the selectable buttons, sending the calendar information for display in the calendar view in-line with the contact list view, wherein the calendar view changes displayed calendar information of the first user to the second user, such that the contact list view of the first user and the calendar view of the second user are distinct from one another and are viewable simultaneously on the page in the horizontal arrangement or the vertical arrangement;

receiving, at the server, a drag and drop feature-generated request from the user machine of the first user to schedule an event, wherein the drag and drop feature-generated request to schedule the event includes (i) selecting a contact from the displayed contact list of the first user within the contact list view using a user interface device, (ii) moving and dropping the selected information to a second location, representing a portion of the calendar information of the second user, within the calendar view, and (iii) displaying a dialog box including a number of fields for scheduling an event;

scheduling, by the server, the event based on the received drag and drop feature generated request of the first user to schedule the event; and editing, at the server, one or more event details in one or more fields of the dialog box of the scheduled event based on at least one received input of the first user from the user interface device.

15. The server of claim 14, wherein the receiving of the drag and drop feature-generated request of the first user includes receiving drag and drop information that is indicative of the information related to when to schedule the event and information, that is to be associated with the event, from the contact list view.

16. The server of claim 14, wherein the method further comprises receiving additional information regarding the event, as a result of an interaction with the dialogue box requesting event details and automatically filled in with information from the contact list view.

17. The server of claim 14, wherein the calendar view simultaneously provides for viewing the calendar information of the second user and calendar information of a third user.

18. The server of claim 14, wherein the calendar view simultaneously provides for viewing the calendar information of the second user and calendar information of the first user.

* * * * *